Jan. 3, 1939.  R. CONKLIN  2,142,962
PNEUMATIC FILLER
Filed Oct. 21, 1936
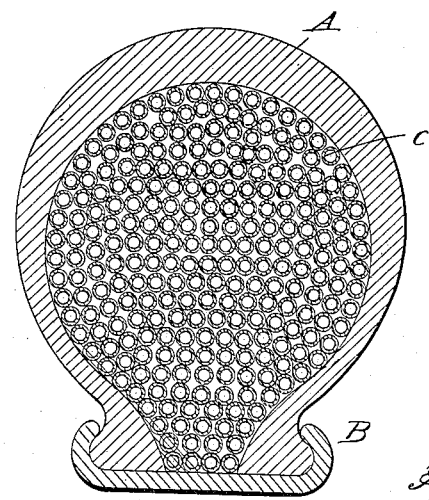
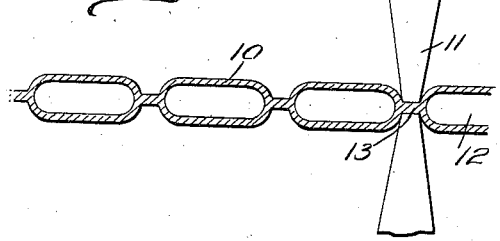
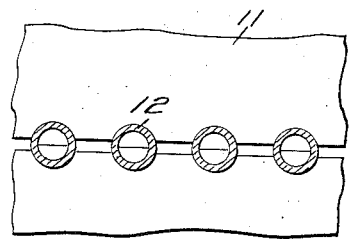
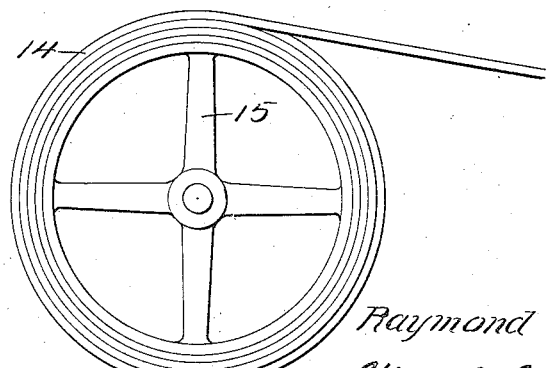
Raymond Conklin.
INVENTOR
BY Victor J. Evans & Co.
ATTORNEYS Patented Jan. 3, 1939

2,142,962

UNITED STATES PATENT OFFICE 2,142,962

PNEUMATIC FILLER

Raymond Conklin, Miami, Fla., assignor of one-third to J. F. Ireland, Miami, Fla.

Application October 21, 1936, Serial No. 106,898

2 Claims. (Cl. 152—312)

The invention relates to a pneumatic filler and more particularly to that type of filler used for vehicle tires, mattresses, balls, buoys, etc.

The primary object of the invention is the provision of a filler of this character, wherein the same involves the formation of a plurality of independent cells having internal pressure and the body creating these cells is coiled on itself by the winding of such body and the coil being of the required size to effect a filler within the tire, mattress, ball, buoy or the like and when functioning as a filler will eliminate complete collapse, as, for example, when within a vehicle tire to effectually avoid blowouts or punctures which will defeat continued use thereof.

Another object of the invention is the provision of a filler of this character, wherein the formation thereof is novel in kind and when employed within a tire casing, mattress body, ball body, buoy body or the like will give the required resiliency thereto and will have the pneumatic effect without liability of a blowout and is practically puncture-proof.

A further object of the invention is the provision of a filler of this character, which is comparatively simple in its construction, thoroughly reliable and effective in its operation, light in weight yet strong, durable, assuring against blowouts and punctures when employed in a tire casing, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a vertical transverse sectional view through a tire casing showing the filler constructed in accordance with the invention applied.

Figure 2 is a fragmentary vertical transverse sectional view through the cellular or chambered body of said filler showing the preferred method of rendering the body cellular or chambered.

Figure 3 is a view similar to Figure 2 showing external pressure application to the cellular body.

Figure 4 is a side elevation of a wheel showing the coiling of the cellular body for the formation of the filler.

Similar reference characters indicate corresponding parts throughout the several views in the drawing.

Referring to the drawing in detail, A designates generally a portion of a tire casing carried upon a rim B of a vehicle wheel and within this casing is the filler C constituting the present invention and hereinafter fully described.

The filler C comprises a tubular body length 10 made preferably of the desired cross sectional size and in this instance of uncured rubber although it may be made from any other material having the desired elasticity or flexibility. This body length 10 is acted upon through suitable mediums 11 for creating individual cells 12 which are noncommunicative with each other and are separated by intermediate flat webs 13, the latter being formed by compressing the walls of the body 10 at determined intervals by said mediums 11 and these walls when brought together and in contact adhere one to the other with the resultant cells 12 created within said body. In the formation of the cells 12 external pressure is had upon the body 10 while within the cells is an internal pressure, these external and internal pressures being equal and while such body is being subjected to external pressure the body length 10 is coiled at 14 upon a wheel 15, the coiling being carried forth until the coil is of a desired size to fit within the casing A or other receiver for the filler, the casing A being slipped over the coil and the open inner periphery of this casing is made secure within the rim B so that the inner open periphery will be closed and in some instances it may be sealed, the external pressure being relieved from the coil when the casing A is secured in place or its inner peripheral opening is sealed. The bringing together of the walls of the body at opposite ends of the cells 12 seals the latter with the internal pressure present therein.

The filler when present within a tire casing gives the pneumatic characteristics to the tire and at the same time eliminates blowouts and punctures and will absorb shocks and jars incident to the use thereof. The webs 13 may be arrived at by vulcanization or the welding of one wall of the body 10 with the other when subjected to external pressure, as, for example, through the mediums 11, the filler being serviceable for use with tires, mattresses, pillows, pads and other articles requiring pneumatic characteristics.

What is claimed is:

1. A filler for a tire casing comprising an elongated tubular member helically wound about itself within the casing in a manner to occupy the entire interior area of the casing, and means dividing said member into a plurality of longitudinally spaced apart non-communicating closed cells.

2. A filler for a tire casing comprising an elongated member helically wound about itself within the casing in a manner to occupy the entire interior area of the casing, said member including a plurality of initially inflated cells, and a webbing connecting the ends of adjacent cells together and disposing the cells in longitudinally spaced apart relation and providing a non-communicating connection between adjacent cells.

RAYMOND CONKLIN.